United States Patent [19]
Oguma et al.

[11] Patent Number: 5,157,499
[45] Date of Patent: Oct. 20, 1992

[54] HIGH-SPEED VIDEO CAMERA USING SOLID-STATE IMAGE SENSOR

[75] Inventors: Kazuhiko Oguma; Yutaka Saito, both of Tokyo; Hiroshi Suzuki, Kanagawa, all of Japan

[73] Assignee: Kabushiki Kaisha n a c, Tokyo, Japan

[21] Appl. No.: 716,630

[22] Filed: Jun. 17, 1991

[30] Foreign Application Priority Data

Jun. 29, 1990 [JP] Japan .................................. 2-172077
Feb. 22, 1991 [JP] Japan .................................. 3-48706

[51] Int. Cl.⁵ ........................ H04N 3/14; H04N 5/335
[52] U.S. Cl. ............................... 358/213.11; 358/225; 358/213.26
[58] Field of Search ............... 358/225, 226, 213.11, 358/49, 50, 213.26

[56] References Cited

U.S. PATENT DOCUMENTS

| | | | |
|---|---|---|---|
| 4,359,757 | 11/1982 | Jaeger | 358/49 |
| 4,378,571 | 3/1983 | Handy | 358/213.26 |
| 4,652,909 | 3/1987 | Glenn | 358/50 |
| 4,825,301 | 4/1989 | Pape et al. | 358/213.26 |
| 5,016,109 | 5/1991 | Gaylord | 358/225 |

FOREIGN PATENT DOCUMENTS 3446146  4/1986  Fed. Rep. of Germany ...... 358/225

Primary Examiner—Michael Razavi
Assistant Examiner—Wendy R. Greening
Attorney, Agent, or Firm—Nilles & Nilles, S.C.

[57] ABSTRACT

A high-speed video camera having a plurality of solid-state black-and-white image pickup elements to which same scene is projected, respectively, each of said image pickup elements consisting of a plurality of photoelectric conversion element rows, some of which are scanned at the same time. A high-speed color video camera having a plurality of solid-state black-and-white image pickup elements and a plurality of solid-state color image pickup elements to which same scene is projected, respectively, each of image pickup elements consisting of a plurality of photoelectric conversion element rows, some of which in the solid-state black-and-white image pickup elements are scanned at the same time so that a luminance signal component is obtained therefrom, and some of which in the solid-state color image pickup elements are scanned at the same time so that a color signal component is obtained therefrom. The luminance signal component and the color signal component are synthesized to form a color image.

3 Claims, 5 Drawing Sheets

FIG. I

F I G . 2
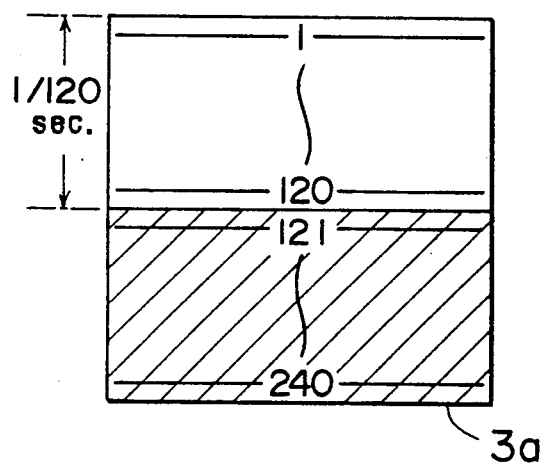
F I G . 3
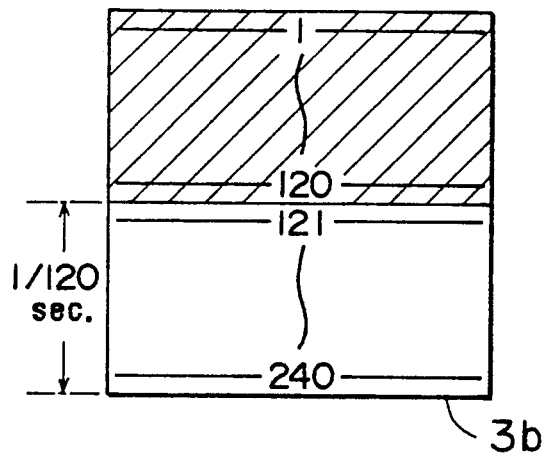

F I G. 6
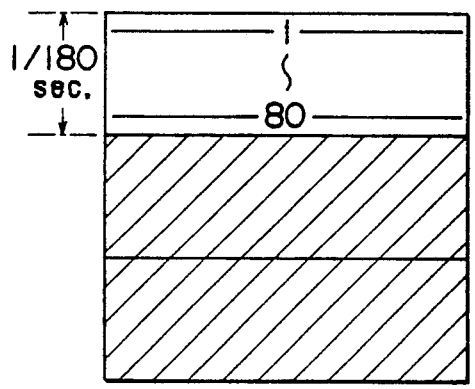
F I G. 7
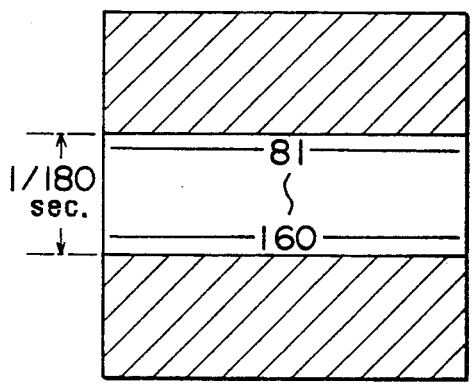
F I G. 8
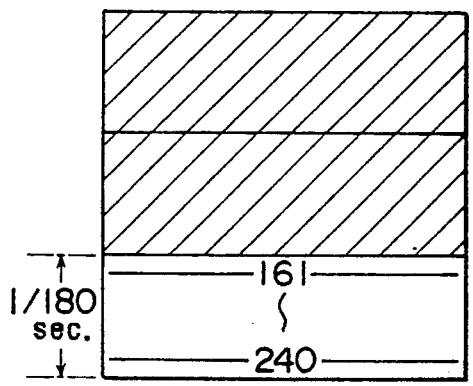

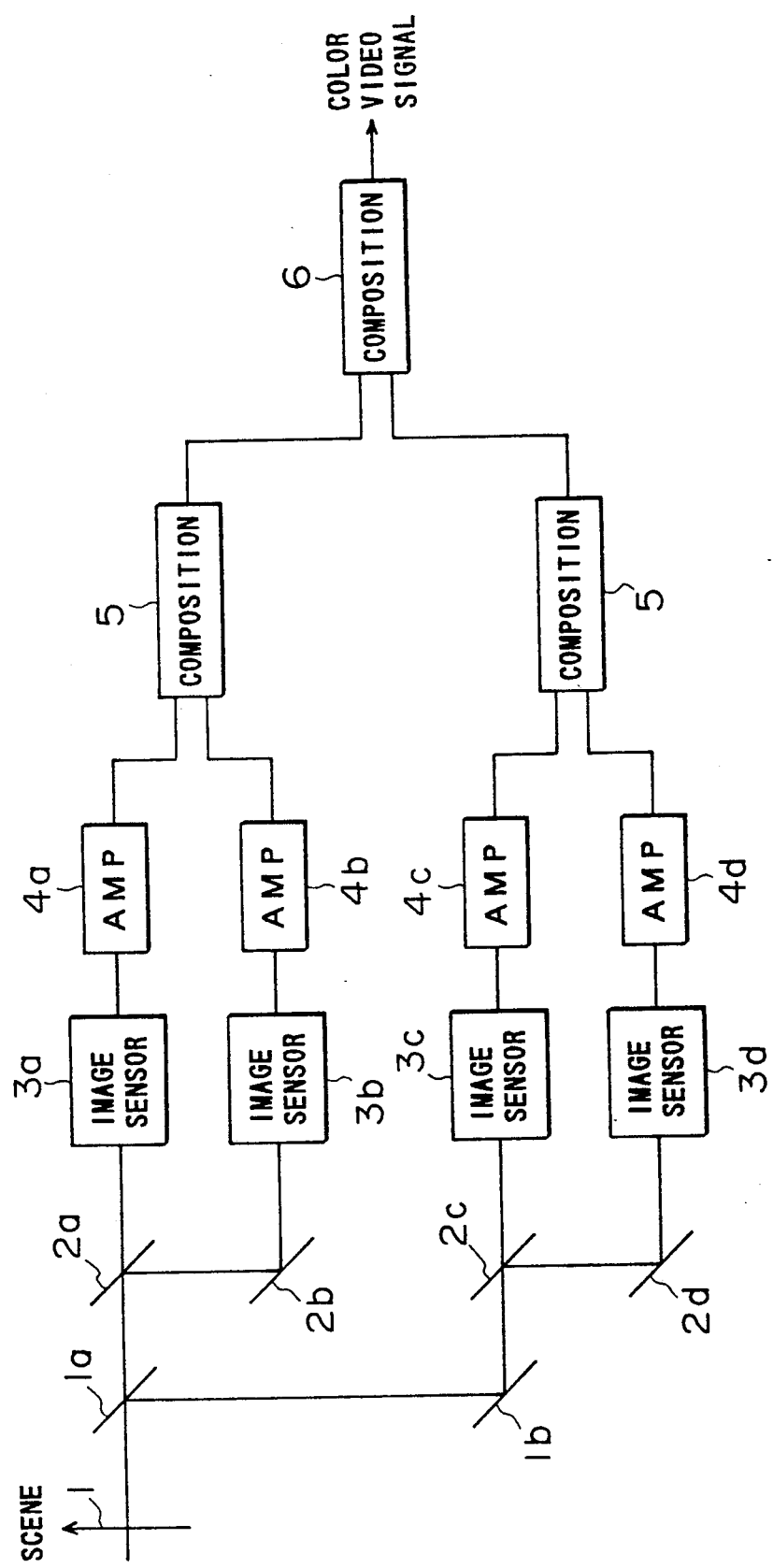

HIGH-SPEED VIDEO CAMERA USING SOLID-STATE IMAGE SENSOR

BACKGROUND OF THE INVENTION

1. Field of the Invention

The present invention relates to a high-speed video camera using a solid-state image pickup element.

2. Description of the Prior Art

In regard to means of high-speed image pickup for home video recorders and color video cameras employed widely for industrial purposes and using MOS-type or CCD-type solid-state image pickup elements, there is a system wherein high-speed scanning and sequential reading are conducted with increased horizontal and vertical drive frequencies. There is also another system, in this regard, wherein an image is divided into a plurality of areas or blocks, and parallel and simultaneous scanning of photoelectric conversion element rows in each block is conducted sequentially for each block, so as to attain a high speed reading.

In the known reading systems described above, the former system is similar to a standard television system, wherein reading is conducted by driving the solid-state image pickup elements at a high speed. Given that a practical number of pixels is supposed to be two hundred fifty thousand or above, the number of stages of MOS shift registers constituting the scanning circuit becomes large and a clock frequency increases in proportion to the speed of scanning. As a result, increases in the wiring capacitance of the clock circuit and the rise time of the clock pulse itself produce adverse effects and consequently, the shift registers are unable to follow the scanning. Moreover, MOS-type elements are problematic due to the capacitances of horizontal and vertical signal lines, while the CCD-type ones have limitations with respect to high-speed scanning caused by the impairment of transfer efficiency.

The above-mentioned latter system is one wherein an image is divided into a plurality of areas or blocks, all the photoelectric conversion element rows in one block are read in parallel and simultaneously, and then the blocks are read sequentially, as disclosed in the National Publication of Translated Version No. 501704/1981. However, this system necessitates a specific solid-state image pickup element which scans all of the photoelectric conversion element rows in one block in parallel and simultaneously, and includes a number of mechanisms for taking out all signals produced by scanning in parallel and simultaneously, and circuits for amplification and processing thereof. Furthermore, an electronic means for recording the signals after reading them out is complicated and accompanied by difficulties in manufacture.

Accordingly, the scanning speed obtained by the above-mentioned former system of the prior art described above is at best two to three times higher than that of standard television (the scanning speed of standard television is 50 to 60 fields per second), and it is impossible to realize scanning at a higher speed than the above using the solid-state image pickup element employed in standard television. On the other hand, the above-mentioned latter system has a shortcoming in that it necessitates that the specific solid-state image pickup element has mechanisms for delivering a plurality of pixel selecting pulses simultaneously from the same vertical shift register and for processing the obtained outputs simultaneously.

SUMMARY OF THE INVENTION

The present invention furnishes a high-speed video camera of a low cost which realizes high-speed scanning three times or more faster in speed than standard television and solves the above-stated shortcomings by using a solid-state image pickup element employed in standard television.

The above object can be attained by a high-speed video camera of the present invention comprising first and second solid-state image pickup elements each having a predetermined number of photoelectric conversion element rows, a mechanism for projecting a scene equally onto said first and second solid-state image pickup elements, a first scanning mechanism for scanning photoelectric conversion element rows of an arbitrary number in said first solid-state image pickup element, a second scanning mechanism for scanning photoelectric conversion element rows of an arbitrary number in said second solid-state image pickup elements being different from the above-mentioned rows in the first solid-state image pickup element scanned by said first scanning mechanism, said second scanning mechanism being synchronized in operation with said first scanning mechanism, and a mechanism for synthesizing signals obtained from said first and second scanning mechanisms in an image.

In the high-speed video camera of the present invention, a scene is projected equally onto the discrete solid-state image pickup elements, the photoelectric conversion element rows of these solid-state image pickup elements are scanned simultaneously by the scanning mechanisms corresponding to them, respectively, these scanned photoelectric conversion element rows of the discrete solid-state image pickup elements are set to be arbitrary numbers not corresponding to each other, and one picture is formed by synthesizing the signals thus obtained.

The above object can also be attained by a high-speed color video camera of the present invention comprising at least first and second solid-state black-and-white image pickup elements each having a plurality of photoelectric conversion element rows, at least first and second solid-state color image pickup elements each having a plurality of photoelectric conversion element rows, a mechanism for projecting a scene equally onto said first and second solid-state black-and-white image pickup elements and first and second solid-state color image pickup elements, a first scanning mechanism for scanning photoelectric conversion element rows of an arbitrary number in said first black-and-white and solid-state color image pickup elements, a second scanning mechanism for scanning photoelectric conversion element rows of an arbitrary number in said second solid-state black-and-white and color image pickup elements being different from the above-mentioned rows in the first black-and-white and color solid-state image pickup elements scanned by said first scanning mechanism, said second scanning mechanism being synchronized in operation with said first scanning mechanism, a mechanism for synthesizing signals obtained from said first and second scanning mechanisms for said first and second solid-state black-and-white image pickup elements in one frame to form a luminance signal component, a mechanism for synthesizing signals obtained from said first and second solid-state color image pickup elements in one frame to form a color signal component, and a mechanism for synthesizing the luminance signal component and the color signal component in a color image.

In the high-speed color video camera of the present invention, a scene is projected equally onto the discrete solid-state image pickup elements, the photoelectric conversion element rows of these solid-state image pickup elements are scanned simultaneously by the scanning mechanisms corresponding to them, respectively, these scanned photoelectric conversion element rows of the discrete solid-state image pickup elements are set to be arbitrary numbers not corresponding to each other, and one color picture is formed by synthesizing the signals thus obtained.

Other objects and features of the present invention will become apparent from the following description taken in conjunction with the accompanying drawings.

BRIEF DESCRIPTION OF THE DRAWINGS

FIGS. 2 and 3 are views for illustrating a scanning method of solid-state image pickup elements in one embodiment of the present invention;

FIGS. 6, 7 and 8 are views for illustrating a scanning method of solid-state image pickup elements in a further embodiment of the present invention; and FIG. 9 is a fundamental block diagram of a high-speed color image pickup camera of the present invention.

DESCRIPTION OF THE PREFERRED EMBODIMENTS

Figure 1:
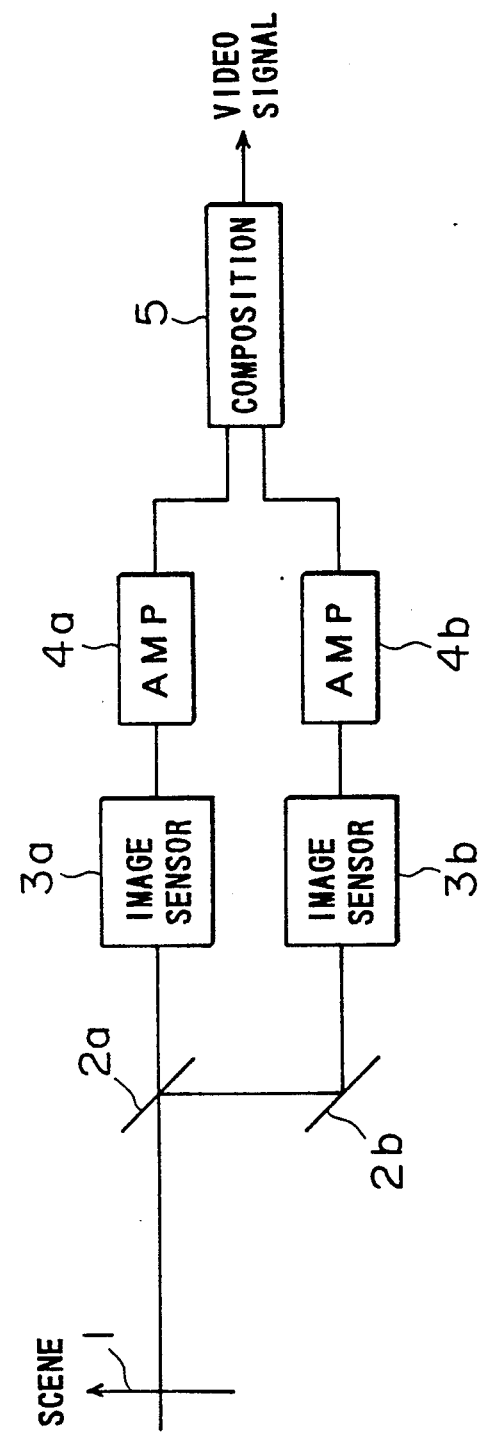
FIG. 1 is a fundamental block diagram of a high-speed image pickup camera of the present invention.

FIG. 1 is a fundamental block diagram of a high-speed image pickup camera of the present invention using two solid-state image pickup elements.

In FIG. 1, numeral 1 denotes a scene, 2a an optical device, e.g. a half-mirror, for separating incident light for two solid-state image pickup elements 3a and 3b, 2b a total reflection mirror, 4a and 4b circuits for reading out signals from the solid-state image pickup elements 3a and 3b, and amplifying and processing them, respectively, and 5 a synthesizing circuit for synthesizing signals from said circuits 4a and 4b so as to form a frame.

FIGS. 2 and 3 illustrate states of the solid-state black-and-white image pickup elements 3a and 3b in FIG. 1 being subjected to divided or partial scanning, respectively. As for an average solid-state image pickup element enabling execution of divided or partial scanning, a TSL (Transversal Signal Line) MOS-type image pickup element can be employed, for instance. A detailed description of this solid-state image pickup element is made, for instance, in the article "TSL Image Pickup Element with Variable Electronic Shutter", the Report on Techniques of the Television Society, ED87-11, issued in 1987. In this image pickup element, a high frequency clock signal is supplied to a vertical shift register in order to read out signals from photoelectric conversion elements disposed in the shape of a matrix. The time for scanning the lines not required to be read out can be made substantially zero.

The divided or partial scanning method will now be explained.

In FIG. 2, an upper area of an image pickup surface of the solid-state image pickup element 3a, i.e. the area defined by scanning lines 1 to 120, is scanned at a speed equivalent to a field scanning time in the ordinary NTSC system, for instance, by inputting vertical clock pulses to the vertical shift register. At the time corresponding to scanning line 121, said shift register is cleared and scanning is returned forcedly and momentarily to line 1 by inputting a reset pulse to the vertical shift register. As a result, a lower area of the image pickup surface, i.e. the area defined by scanning lines 121 to 240 (the hatched part), is not scanned, and the scanning time for the solid-state image pickup element 3a is reduced naturally to ½ of that required in the case where the whole image pickup surface is scanned at scanning speed of the standard television.

In FIG. 3, in contrast, the hatched part of the solid-state image pickup element 3b, i.e. the area defined by scanning lines 1 to 120, is scanned at high speed until the time corresponding to line 120, by inputting a horizontal clock pulse to the vertical shift register at the time corresponding to line 1. While the frequency of the vertical clock pulses is 15.75 KHz ordinarily, the frequency of the horizontal clock pulses is several MHz. Accordingly, the time required for high-speed scanning by the horizontal clock pulses is short and can be substantially neglected. After the time corresponding to scanning line 121, a vertical clock pulse is inputted to the vertical shift register so as to scan the lower area of the image pickup surface, i.e. the area of scanning lines 121 to 240, at the scanning speed of standard television. As a result, the scanning time of the solid-state image pickup element 3b is reduced to ½ of that required in the case where the whole image pickup surface is scanned at the scanning speed of standard television, in the same way as in the case of the solid-state image pickup element 3a. Signals obtained by these two processes are processed to have proper signal levels by the amplifying-and-processing circuits 4a and 4b and synthesized in the synthesizing circuit 5 having a recording function for forming one frame.

Figure 4:
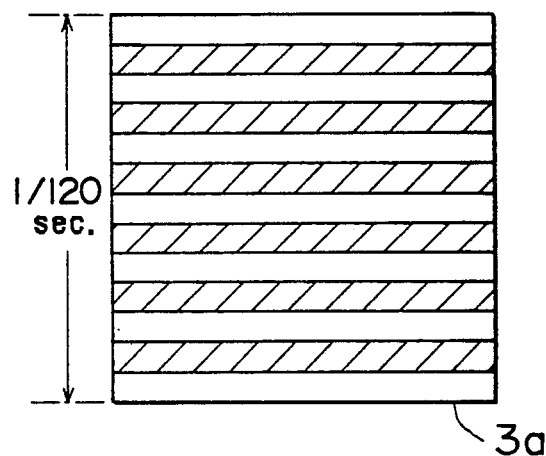
FIGS. 4 and 5 are views for illustrating a scanning method of solid-state image pickup elements in another embodiment of the present invention.
Figure 5:
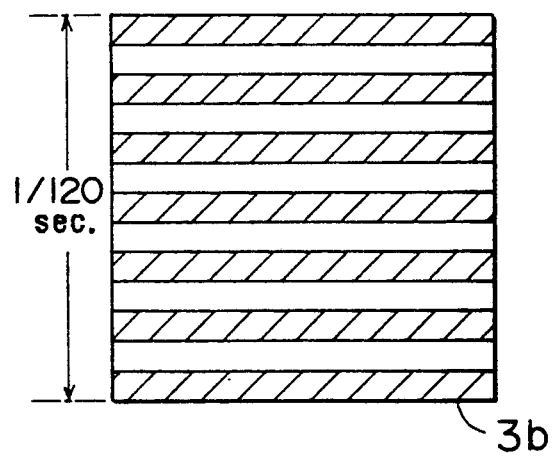

The above is a detailed description of an embodiment wherein the solid-state image pickup elements 3a and 3b are divided in two areas, the upper and lower areas, respectively, and the respective scanning areas thereof are scanned so that they do not overlap each other. It is also possible, in this regard, to provide alternately a plurality of scanning areas and areas not requiring scanning (hatched parts) and to scan separately the corresponding areas of the solid-state image pickup elements 3a and 3b so that they do not overlap each other, as shown in FIGS. 4 and 5. In this example, the scanning time for reading the areas not requiring scanning is made substantially zero by supplying the horizontal clock pulse to the vertical shift register as stated above and scanning the scanning areas at the scanning speed of standard television. Thereby the whole image pickup surface can be read in e.g. 1/120 seconds, that is, at a speed which is double that of standard television.

FIGS. 6 to 8 illustrate another embodiment using three solid-state image pickup elements, respectively. In this embodiment, each solid-state image pickup element is divided into three areas or blocks, i.e., scanning lines 1 to 80, 81 to 160 and 161 to 240, and is scanned. It is understood with ease that speeds three times as high as the scanning speed of standard television can be obtained after synthesis when each area is scanned at this scanning speed, and that a speed six times as high as the scanning speed can be obtained after synthesis when each area is scanned at a scanning speed two times higher than that of standard television.

The present invention can be also applied to the case where four or more solid-state image pickup elements are employed and the photoelectric conversion element rows thereof are divided into four or more areas or blocks. When the number of elements is increased too much, however, the cost thereof rises and, in addition, hardware therefor becomes complicated.

According to these embodiments of the present invention, elements for standard television can be used as solid-state image pickup elements and a high-speed video camera can be obtained without using any specific solid-state image pickup element as used in the prior-art apparatus.

FIG. 9 shows a fundamental block diagram of a high-speed color image pickup camera of the present invention using two solid-state black-and-white image pickup elements and two solid-state color image pickup elements.

In this embodiment, incident light from a scene 1 is applied to two optical paths for black-and-white and color through optical devices, e.g. a half-mirror 1a and a total reflection mirror 1b, respectively, and then applied to two solid-state black-and-white image pickup elements 3a and 3b, and two solid-state color image pickup elements 3c and 3d through optical devices, e.g. half-mirrors 2a and 2c, and total reflection mirrors 3b and 3d, respectively.

Signals from the solid state image pickup elements 3a, 3b, 3c and 3d are read out through amplifying-and-processing circuits 4a, 4b, 4c and 4d, respectively, and synthesized by synthesizing circuits 5 to form a black-and-white frame and a color frame, respectively.

A luminance signal component obtained from said black-and-white frame and a color signal component obtained from said color frame are synthesized by a synthesizing circuit 6 to form a color image.

In another embodiment of the present invention, three or more solid-state black-and-white and color image pickup elements may be used.

While elements for standard television can be used as solid-state image pickup elements in the embodiments of the present invention and a high-speed color video camera can be obtained without using any specific solid-state image pickup element as used in the prior-art apparatus, this embodiment of the present invention produces such advantages that a sufficiently large luminance signal component of a color video signal can be obtained because the luminance signal component is obtained from the solid-state black-and-white image pickup elements 3a and 3b. In this way, the color signal component can be increased by reducing the bandwidth of the color signal to e.g. 1/10 of that in conventional cases, since it is unnecessary to obtain the luminance signal component from solid-state color image pickup elements 3c and 3d.

What is claimed is:

1. A high-speed video camera comprising first and second solid-state image pickup elements each having a predetermined number of photoelectric conversion element rows, a mechanism for projecting an entire scene equally onto said first and second solid-state image pickup elements, a first scanning mechanism for scanning photoelectric conversion element rows of an arbitrary number in said first solid-state image pickup element, a second scanning mechanism for scanning photoelectric conversion element rows of an arbitrary number in said second solid-state image pickup elements being different from the above-mentioned rows in the first solid-state image pickup element scanned by said first scanning mechanism, said second scanning mechanism being synchronized in operation with said first scanning mechanism, and a mechanism for synthesizing signals obtained from said first and second scanning mechanisms in an image.

2. A high-speed video camera comprising first, second and third solid-state image pickup elements each having a predetermined number of photoelectric conversion element rows, a mechanism for projecting an entire scene equally onto said first, second and third solid-state image pickup elements, a first scanning mechanism for scanning photoelectric conversion element rows of an arbitrary number in said first solid-state image pickup element, a second scanning mechanism for scanning photoelectric conversion element rows of an arbitrary number in said second solid-state image pickup elements being different from the above-mentioned rows in the first solid-state image pickup element scanned by said first scanning mechanism, a third scanning mechanism for scanning photoelectric conversion element rows of an arbitrary number in said third solid-state image pickup elements being different from the above-mentioned rows in the first and second solid-state image pickup elements scanned by said first and second scanning mechanisms, respectively, said first, second and third scanning mechanism being synchronized in operation with one another, and a mechanism for synthesizing signals obtained from said first, second and third scanning mechanisms in an image.

3. A high-speed video camera comprising at least first and second solid-state black-and-white image pickup elements each having a plurality of photoelectric conversion element rows, at least first and second solid-state color image pickup elements each having a plurality of photoelectric conversion element rows, a mechanism for projecting an entire scene equally onto said first and second solid-state black-and-white image pickup elements and first and second solid-state color image pickup elements, a first scanning mechanism for scanning photo-electric conversion element rows of an arbitrary number in said first black-and-white and solid-state color image pickup elements, a second scanning mechanism for scanning photoelectric conversion element rows of an arbitrary number in said second solid-state black-and-white and color image pickup elements being different from the above-mentioned rows in the first black-and-white and color solid-state image pickup elements scanned by said first scanning mechanism, said second scanning mechanism being synchronized in operation with said first scanning mechanism, a mechanism for synthesizing signals obtained from said first and second scanning mechanisms for said first and second solid-state black-and-white image pickup elements in one frame to form a luminance signal component, a mechanism for synthesizing signals obtained from said first and second solid-state color image pickup elements in one frame to form a color signal component, and a mechanism for synthesizing the luminance signal component and the color signal component in a color image.

* * * * *